United States Patent [19]

Ohm et al.

[11] Patent Number: 6,119,297
[45] Date of Patent: Sep. 19, 2000

[54] WET MOP FOR PLANAR SURFACES

[75] Inventors: Heinz Josef Ohm, Limburg; Norbert Pakusa, Schweighausen, both of Germany

[73] Assignee: Leifheit AG, Nassau, Germany

[21] Appl. No.: 09/178,947

[22] Filed: Oct. 26, 1998

[30] Foreign Application Priority Data

Nov. 6, 1997 [EP] European Pat. Off. ............. 97119400

[51] Int. Cl.$^7$ ................................................ A47L 13/146
[52] U.S. Cl. ......................... 15/119.2; 15/228; 15/244.2; 15/244.3
[58] Field of Search .............................. 15/116.1, 116.2, 15/119.1, 119.2, 228, 244.2, 244.3

[56] References Cited

U.S. PATENT DOCUMENTS

| | | | |
|---|---|---|---|
| 2,730,744 | 1/1956 | Vaughn | 15/119.2 |
| 2,774,092 | 12/1956 | Vaughn | 15/119.2 |
| 2,864,107 | 12/1958 | Greenleaf | 15/119.2 |
| 2,959,799 | 11/1960 | Greenleaf et al. | 15/119.2 |
| 2,961,676 | 11/1960 | Rebernak et al. | 15/119.2 |
| 3,295,155 | 1/1967 | Belsky et al. | 15/228 X |
| 4,455,705 | 6/1984 | Graham | 15/244.2 X |
| 4,799,283 | 1/1989 | Haydon | 15/228 X |
| 5,069,859 | 12/1991 | Loren | 264/572 |
| 5,419,015 | 5/1995 | Garcia | 15/244.3 X |
| 5,483,720 | 1/1996 | Decoopman et al. | 15/119.2 |

FOREIGN PATENT DOCUMENTS

| | | | |
|---|---|---|---|
| 276261 | 1/1966 | Australia | 15/116.2 |
| 466474 | 7/1950 | Canada | 15/119.2 |
| 0 268 787 | 6/1988 | European Pat. Off. . | |
| 0 494 021 | 7/1992 | European Pat. Off. . | |
| 1237638 | 6/1960 | France | 15/119.2 |
| 617197 | 7/1935 | Germany . | |
| 1 954 499 | 2/1967 | Germany . | |
| 1 908 928 | 2/1969 | Germany . | |
| 76184 | 1/1950 | Norway | 15/119.2 |
| 1342068 | 12/1973 | United Kingdom | 15/119.2 |
| 2 203 932 | 11/1988 | United Kingdom . | |
| 90/0046 | 1/1990 | WIPO . | |

*Primary Examiner*—Mark Spisich
*Attorney, Agent, or Firm*—Frishauf, Holtz, Goodman, Langer & Chick, P.C.

[57] ABSTRACT

A wet mop for planar surfaces includes two wiping plates, a double-hinged member disposed between the two wiping plates, a handle pivotably fixed to the double-hinged member, a sliding sleeve mounted on the handle, two pressure arms molded onto the sliding sleeve in a V-shaped configuration, and two articulated levers. Each of the two articulated levers is disposed on a respective one of the two pressure arms and each of the two articulated levers is movably coupled to a respective one of the two wiping plates. The two wiping plates can be squeezed against each other using the two articulated levers.

6 Claims, 4 Drawing Sheets

WET MOP FOR PLANAR SURFACES

BACKGROUND OF THE INVENTION

The present invention relates to a wet mop for planar surfaces with two wiping plates with wiping pads that can be squeezed against each other via articulated levers.

Examples of a wet mop for planar surfaces are disclosed in German Utility Model 19 54 499 and German Patent 19 08 928. Common to both of these conventional devices, however, is the use of a sponge as wiping pad. A sponge has a sufficiently large water-absorption capacity, but a sponge can also bind dirt to only a relatively small extent and has poor dirt-loosening ability. In addition, a sponge has practically zero scouring effect. Another disadvantage of these conventional devices is that they utilize a metal rod having multiple joints for the operation thereof. Such multiply jointed rods increase the manufacturing cost of these devices, and also tend to cause these devices to malfunction. Still further, since the multiple jointed rods are made of metal, these devices are also subject to corrosion.

SUMMARY OF THE INVENTION

The object of the invention is to provide a wet mop for planar surfaces which can be inexpensively manufactured, which has adequate dirt-absorption capacity, and whose wiping pad is suitable by virtue of its scouring action for loosening obstinate dirt.

Briefly, the wet mop includes tow wiping plates, a double-hinged member disposed between the two wiping plates, a handle pivotably fixed to the double-hinged member, a sliding sleeve mounted on the handle, two pressure arms molded onto the sliding sleeve in a V-shaped configuration, and two articulated levers. Each of the two articulated levers is disposed on a respective one of the two pressure arms and each of the two articulated levers is movably coupled to a respective one of the two wiping plates. The two wiping plates can be squeezed against each other by means of the two articulated levers.

The wiping pad, attachable to the wiping plates, e.g. in the manner of a hook-and-loop fastener, is a multi-element structure having a cushioning, spring, water-reservoir portion and an active wiping portion, which has a surface of dirt-loosening material.

BRIEF DESCRIPTION OF THE DRAWINGS

The accompanying drawings illustrate a preferred embodiment of the present invention, and the above object and other advantages of the present invention will become apparent from these drawings taken together with the detailed description set forth hereinbelow. In the drawings.

DETAILED DESCRIPTION

Figure 2:
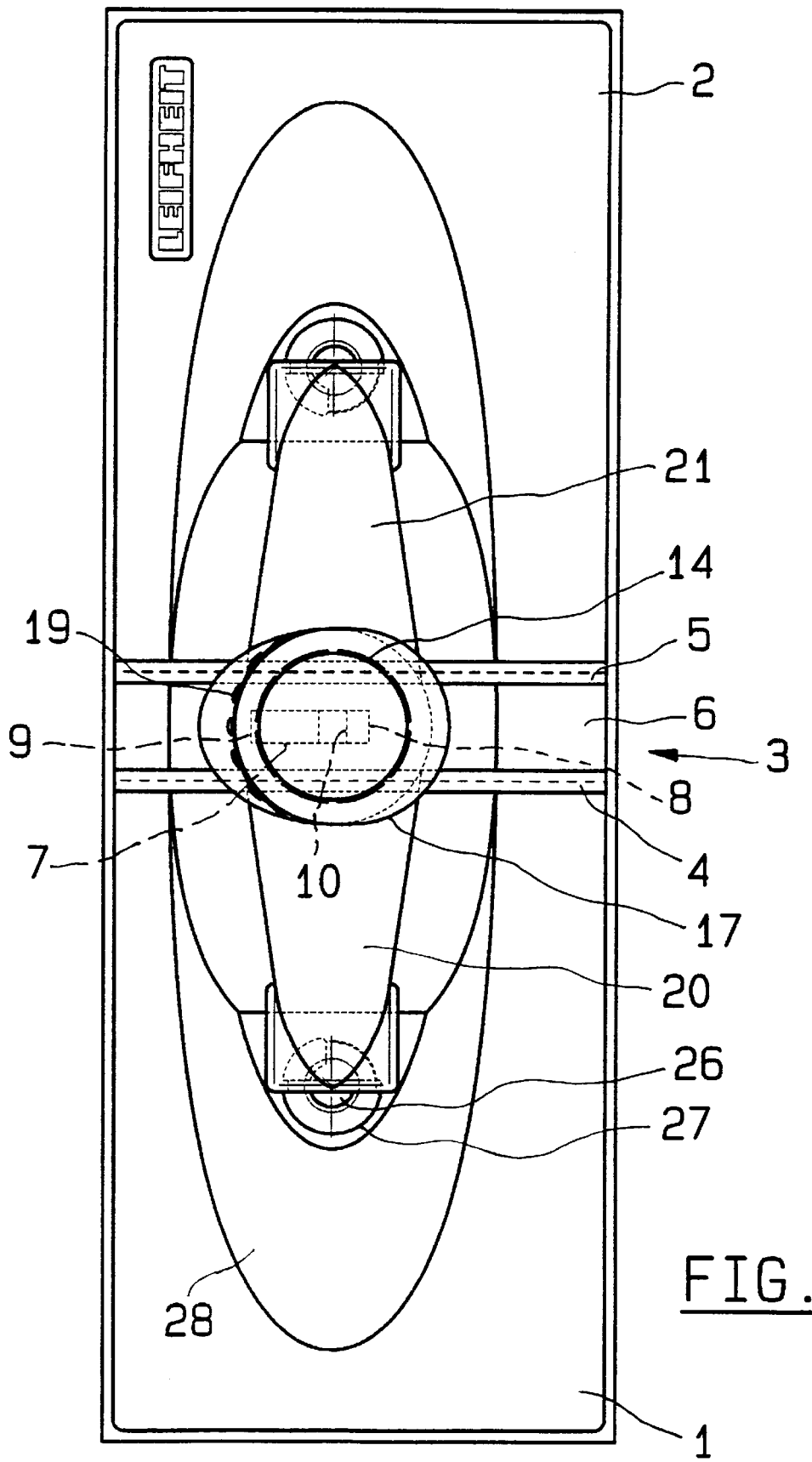
FIG. 2 shows a top view of the wet mop.

As shown in FIG. 2, two wiping plates 1 and 2 are joined together by a double-hinged member 3 disposed therebetween. The double-hinged member 3 is formed by two film hinges 4 and 5, thus creating a middle plate 6. A web 7 rounded at the front side 8 and rectangular at the rear side 9 is molded onto the middle plate 6. Web 7 is provided with a bore 10.

Figure 3:
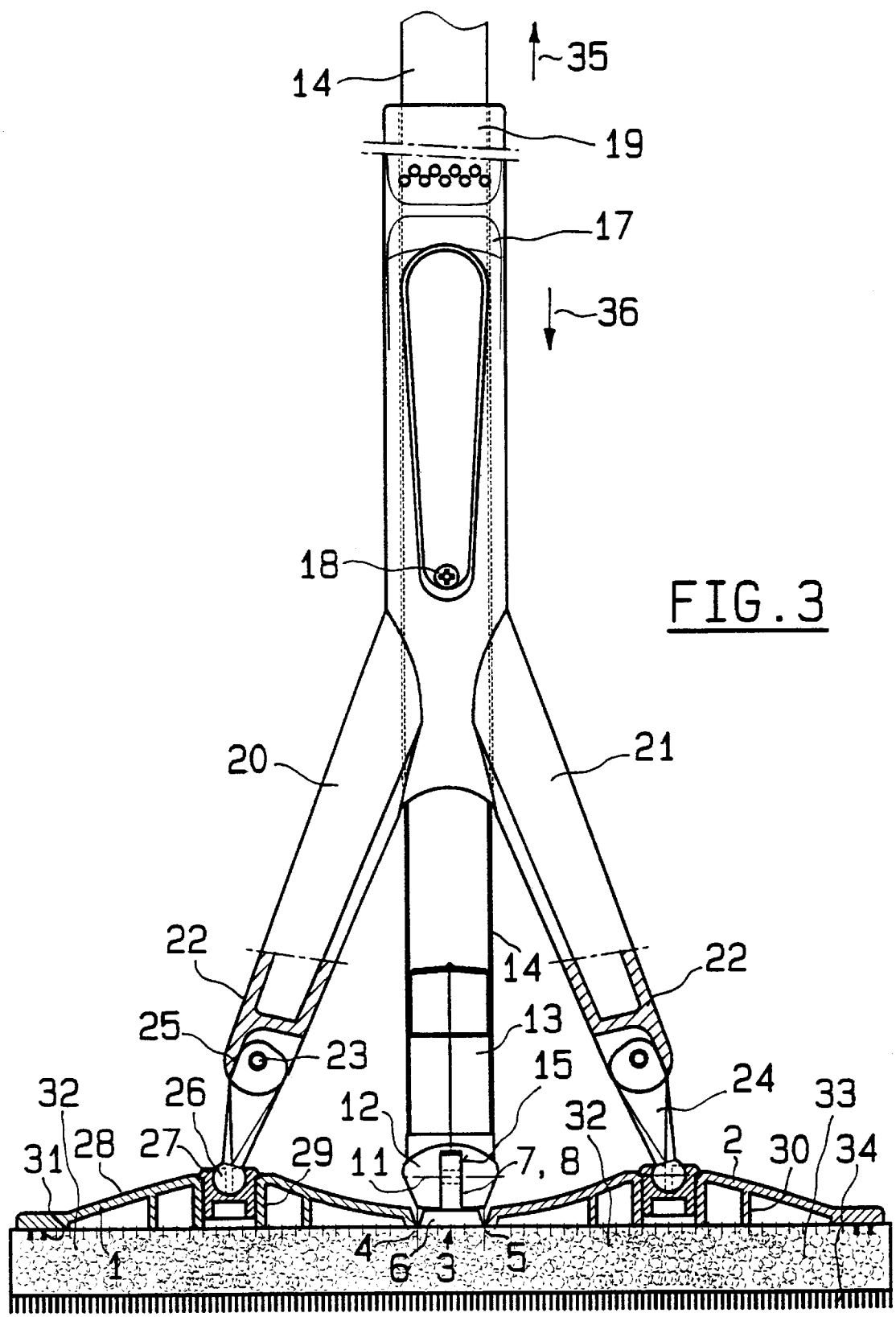
FIG. 3 shows a partial cutaway front view of the wet mop in the wiping position.

As shown in FIG. 3, the bore 10 is adapted to receive a retaining spindle 11, via which a handle socket 12 is fixed to be pivotable in at least a forward direction. The handle socket 12 merges into a round neck 13, onto which the handle 14 is pressfitted. The handle socket 12 is provided at the front with an open slit 15, so that the handle 14 can be pivoted in the forward direction shown by arrow 16 in FIG. 1.

Figure 1:
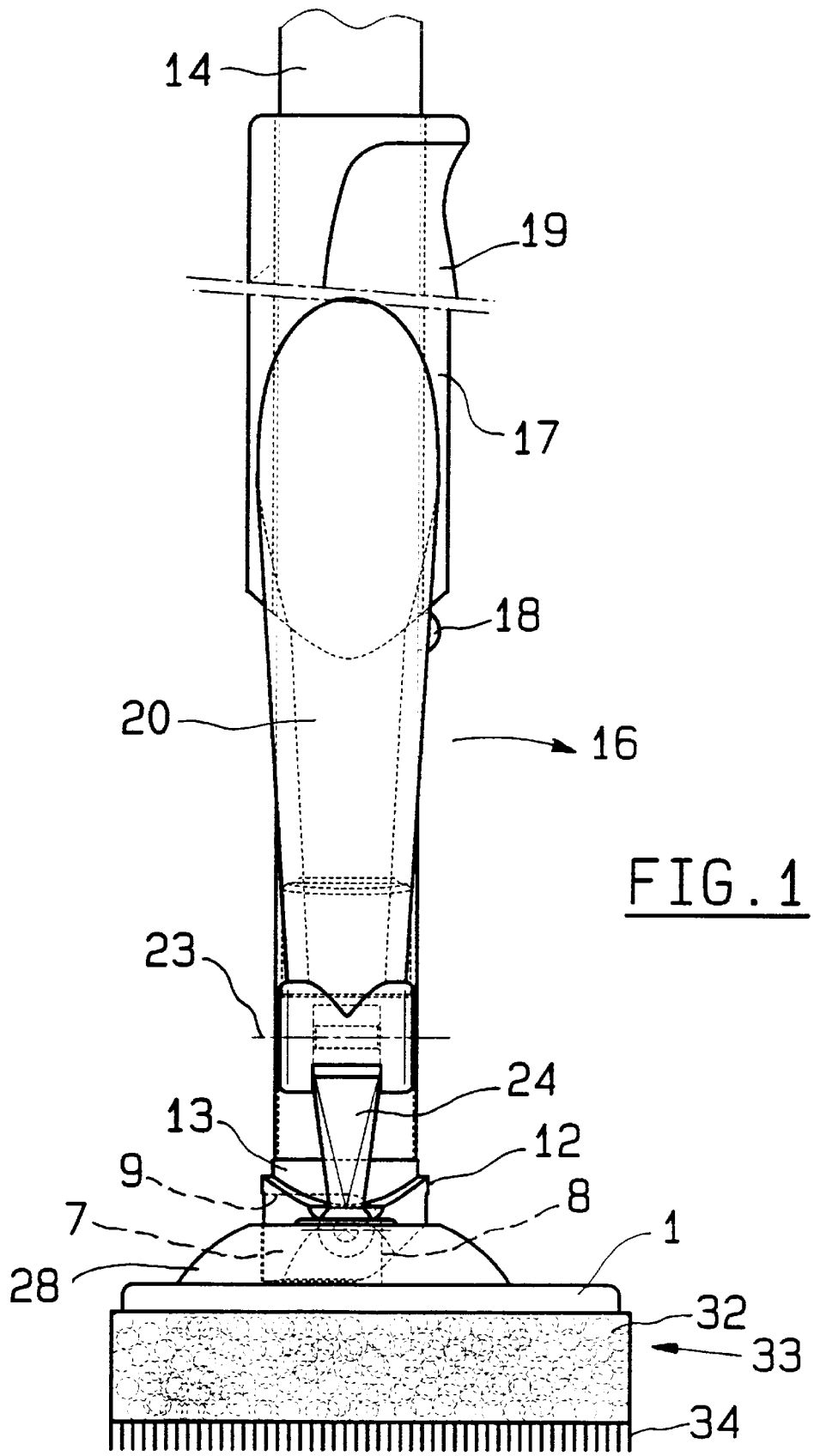
FIG. 1 shows a side view of a preferred embodiment of the wet mop of the present invention in a wiping position.

As shown in FIG. 1, a sliding sleeve 17, which can be slidingly moved to a stop 18, is mounted on handle 14.

As shown in FIG. 3, the stop 18 is positioned such that when the sliding sleeve 17 is moved thereto, the wiping plates 1 and 2 and the middle plate 6 are aligned in one plane. The sliding sleeve 17 comprises a grip part 19 and two pressure arms 20 and 21. The two pressure arms 20 and 21 are arranged in a V-shaped configuration.

Also as shown in FIG. 3, articulated levers 24 are fixed via hinge pins 23 at the ends 22 of pressure arms 20 and 21. The articulated levers 24 run up against stop faces 25, which define a maximum amount of spread. Balls 26 are molded onto the ends of the articulated levers 24, and ball sockets 27 are provided on wiping plates 1 and 2. Accordingly, when the balls 26 are snapped in the ball sockets 27, the articulated levers 24 are mounted to be movable with respect to the wiping plates 1 and 2. Retaining sleeves 29 are molded into elliptical raised members 28 in wiping plates 1 and 2 for the purpose of retaining the ball sockets 27. These retaining sleeves 29 as well as additional webs 30 ensure even transmission and distribution of force into wiping plates 1 and 2.

As shown in FIG. 3, the articulated levers 24 are mounted to respective center portions of the wiping plates 1 and 2.

And as shown in FIG. 2, molded hooks 31 are provided on the underside of wiping plates 1 and 2 as well as on the underside of middle plate 6 for retaining a wiping pad 33. The molded hooks 31 engage in the manner of a hook-and-loop fastener, a base layer 32 of the wiping pad 33. Besides the base layer 32, the pad 33 also includes an active wiping layer 34 laminated onto the base layer 32 which, in turn, adheres to the underside of the wiping plates 1 and 2.

Figure 4:
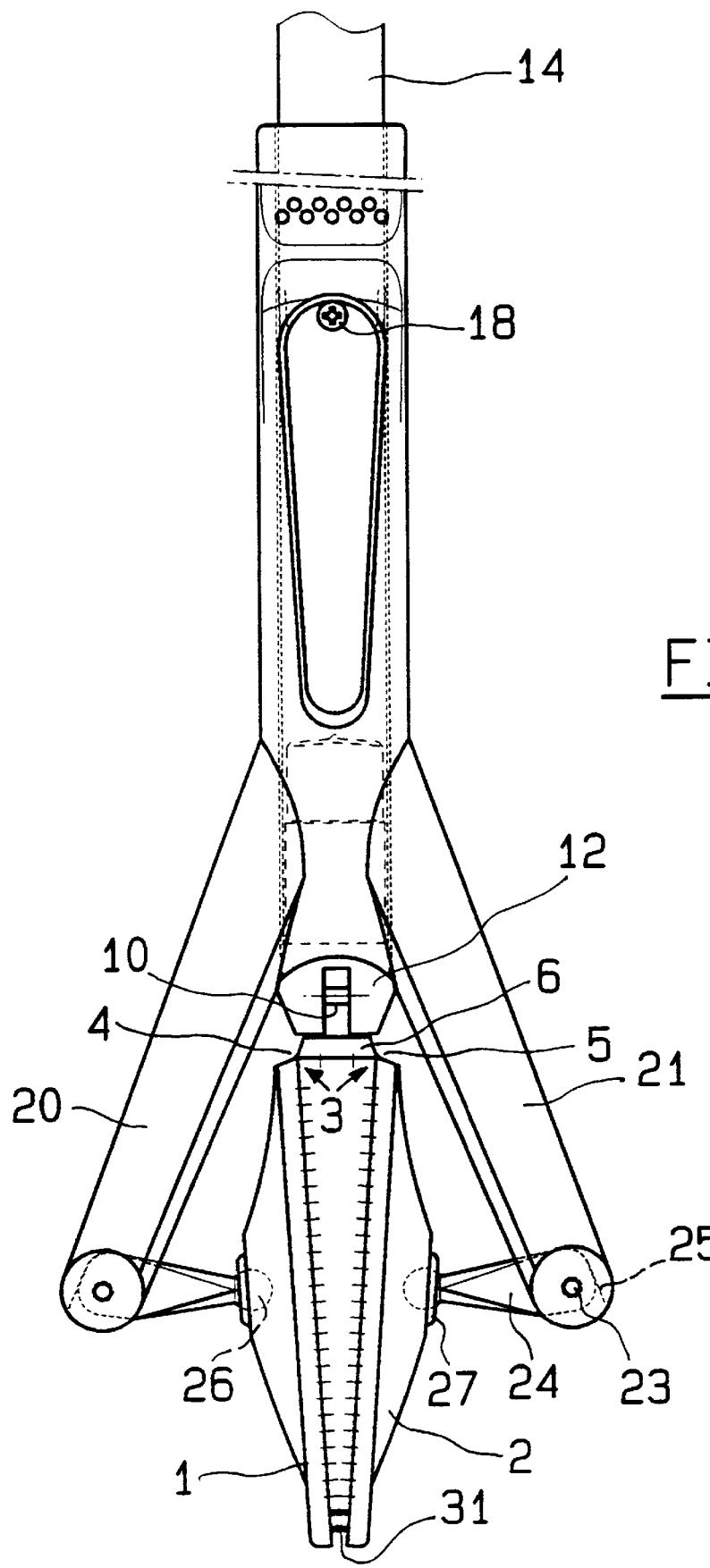
FIG. 4 shows a front view of the wet mop in a squeezing position without a wiping pad.

The functional principle of the wet mop of the present invention is readily evident from FIGS. 3 and 4. FIG. 3 shows the wet mop in a wiping position, with the sliding sleeve 17 abutting against stop 18 on the handle 14 and the wiping pad 33 provided on wiping plates 1 and 2 and the middle plate 6 aligned in one plane. To squeeze out the wiping pad 33, handle 14 is moved in direction 35 and sliding sleeve 17 is pushed in direction 36, thus moving the wet mop into a squeezing position as shown in FIG. 4.

Ideal leverage conditions are achieved by the V-shaped configuration of pressure arms 20 and 21 and the middle linkage of the articulated levers 24. Accordingly, large squeezing forces can be achieved by a relatively small pushing force on sliding sleeve 17.

Various advantageous effects of the wet mop of the present invention will now be explained.

First, by active incorporation of the handle as an operating member for adjusting the wiping plates, the design, assembly and manufacturing costs of the wet mop are decisively advantageously influenced. Specifically, the wet mop of the present invention is less expensive to produce than conventional wet mops and has a more pleasing form. The sliding sleeve, pressure arms and articulated levers, for example, can be made as plastic parts.

Second, the linkage of the two wiping plates via the double-hinged members to the plane middle part, on which the handle pivotably engages, and the approximately central linkage of the articulated levers on the wiping plates enable a particularly large-area and even distribution of force to be achieved. As a result, handling is simplified and an additional pivoting lever for operation of the pull rod is not necessary. In addition, wiping can be achieved on the whole with less pressing effort, so that the wiping pad is treated more gently while having the same cleaning ability. The wiping pad therefore lasts much longer. On the other hand, high squeezing-out forces are possible and can be further increased by constructing the sliding sleeve, the articulated levers and the wiping plates (i.e., the sliding sleeve 17 and the parts 20, 21) into an integral unitary member according to a gas internal pressure method (that is, by a method of injection molding with pressurized-fluid assist to form a hollow part), such as by the techniques disclosed in U.S. Pat. No. 5,069,859 (Inventor: N. S. Loren), the entire contents of which are incorporated herein by reference. The techniques disclosed in PCT International Publication No. WO 90/0046 could also be used.

Third, the retaining hooks 31 molded onto the underside of the wiping plates 1, 2 simplify handling by enabling the wiping pad 33 to be easily attached in the manner of a hook-and-loop fastener. And since the retaining hooks are made integrally with the wiping plates in a single working operation, no further time and effort need be spent on attaching retaining elements of any kind with adhesive.

In order to achieve a secure grip between the wiping pad 33 and the wiping plates 1, 2 on the one hand and optimum squeezing out of moisture from the wiping pad on the other hand, the wiping pad is constructed in two layers, namely the base layer 32 and an active wiping layer 34. The base layer 32 also has a cushioning or springy effect and additionally functions as the wiping-water reservoir. The active wiping layer 34, which is joined by force-locking to the base layer, by lamination or another suitable method, can be dedicated completely to the function of loosening and absorbing dirt.

According to the present invention, different active wiping layers 34 can be used for different cleaning tasks as well as for different floor covering types. For example, laminate floors and parquet floors are relatively sensitive to moisture and should be cleaned if at all possible with only a very slight excess of moisture. A wiping pad 33 having a natural or synthetic chamois leather active wiping layer 34 may therefore be most suitable for these floors. In this respect, a synthetic chamois leather comprising a cotton-polyester fabric (40:60) with coagulated polyurethane layer roughened to a velour-like condition has proved to be particularly effective. By contrast, a wiping pad having an active wiping layer 34 comprising a tufted or woven cloth containing pile threads of a cotton-polyester fiber mixture can be used for cleaning PVC floors, normal smooth marble and/or tile floors. The pile threads for this purpose can be made with a cut finish, whereas a pile thread having a loop finish may be more suitable for use on rough and badly soiled floors.

Finally, it has been found that the functions of loosening dirt and absorbing dirt can be achieved by forming the wiping layer 34 of a cloth comprising closely arrayed linen pile threads. Thus, the use of chemical fibers such as polyesters, polyamides, acrylics and others which ordinarily have the function of loosening dirt can be avoided, and the advantages of cotton fibers which ordinarily absorb dirt are retained. In particular, it has been found that linen fibers act in the manner of microfibers and are much less susceptible to rotting than cotton fibers. It has also been found that linen fibers have a good capacity for both dirt and water absorption. Furthermore, such a natural fiber can be squeezed out much more easily than a chemical fiber. In particular, with linen fibers, residual moisture is retained, whereas with chemical fibers, which in any case hold water only by capillary action, dripping is continues even when the residual moisture content is low.

Having described a specific preferred embodiment of the invention with reference to the accompanying drawings, it will be appreciated that the present invention is not limited to that specific embodiment, and that various modifications can be effected thereto by one of ordinary skill in the art without departing from the scope or spirit of the invention, as defined in the appended claims.

What is claimed is:

1. A wet mop comprising:

two wiping plates;

a double-hinged member disposed between the two wiping plates;

a handle pivotably fixed to the double-hinged member;

a sliding sleeve mounted on the handle;

two pressure arms molded onto the sliding sleeve in a V-shaped configuration;

wherein at least the sliding sleeve and the two pressure arms comprise an integral, unitary, gas-internal pressure formed member, two articulated levers, each of which is disposed on a respective one of the two pressure arms and each of which is movably coupled to a respective one of the two wiping plates;

a wiping pad having at least a base layer and an active wiping layer; and retaining hooks molded onto the underside of each of the wiping plates for engaging the base layer of the wiping pad in the manner of a hook-and-loop fastener, and wherein:

said base layer of the wiping pad is a wiping water reservoir comprising a squeezable water retaining material having a cushioning or springy effect, and said active wiping layer of the wiping pad comprises dirt loosening and absorbing material.

2. A wet mop according to claim 1, wherein the active wiping layer comprises one of a natural chamois leather and a synthetic chamois leather.

3. A wet mop according to claim 1, wherein the active wiping layer comprises one of a tufted and a woven cloth, and said cloth contains pile threads of a cotton-polyester fiber mixture.

4. A wet mop according claim 1, wherein the active wiping layer comprises a cloth containing linen pile threads.

5. A wet mop according to claim 1, wherein the active wiping layer is selected from the group consisting of: (i) a natural chamois leather, (ii) a synthetic chamois leather, (iii) a tufted cloth containing pile threads of a cotton-polyester fiber mixture, (iv) a woven cloth containing pile threads of a cotton-polyester fiber mixture, and (v) a cloth containing linen pile threads.

6. The combination of:

first and second wiping plates;

a double-hinged member disposed between the first and second wiping plates;

a handle pivotably fixed to the double-hinged member;

a sliding sleeve mounted on the handle;

two pressure arms molded onto the sliding sleeve in a V-shaped configuration;

two articulated levers, each of which is disposed on a respective one of the two pressure arms and each of which is movably coupled to a respective one of the two wiping plates;

wherein the two articulated levers are linked to respective center portions of the two wiping plates, and at least the sliding sleeve and the two pressure arms comprise an integral gas-internal pressure formed member; and retaining hooks molded onto the underside of each of the wiping plates, with a wiping pad;

wherein the wiping pad comprises at least a base layer which is engageable with the retaining hooks molded onto the underside of each of the wiping plates in the manner of a hook-and-loop fastener, and an active wiping layer, and wherein said base layer is a wiping water reservoir comprising a squeezable water retaining material having a cushioning or springy effect and said active wiping layer comprises one of: (i) a natural chamois leather, (ii) a synthetic chamois leather, (iii) a tufted cloth containing threads of a cotton polyester fiber mixture, (iv) a woven cloth containing pile threads of a cotton polyester fiber mixture, and (v) a cloth containing linen pile threads.

* * * * *